United States Patent [19]
Matsugu et al.

[11] Patent Number: 5,625,408
[45] Date of Patent: Apr. 29, 1997

[54] THREE-DIMENSIONAL IMAGE RECORDING/RECONSTRUCTING METHOD AND APPARATUS THEREFOR

[75] Inventors: Masakazu Matsugu, Chiba-ken; Katsumi Iijima, Hachioji, both of Japan

[73] Assignee: Canon Kabushiki Kaisha, Tokyo, Japan

[21] Appl. No.: 575,332

[22] Filed: Dec. 20, 1995

Related U.S. Application Data

[63] Continuation of Ser. No. 263,754, Jun. 22, 1994, abandoned.

[30] Foreign Application Priority Data

Jun. 24, 1993 [JP] Japan ................................. 5-153859
Sep. 21, 1993 [JP] Japan ................................. 5-234583

[51] Int. Cl.$^6$ .......................... H04N 13/02; H04N 13/04
[52] U.S. Cl. ......................... 348/42; 348/46; 348/232
[58] Field of Search ............................ 348/207, 42, 46, 348/47, 232

[56] References Cited

U.S. PATENT DOCUMENTS 4,815,819  3/1989  Mayhew et al. ................ 348/42 X

OTHER PUBLICATIONS

Takaai Izouka and Hiroshi Watanabe, "Stereo Picture Coding Using Disparity Compensation", *Singakugihou*, IE89–1, pp. 1–7 (1989).
Kamuda, *Hosogijitsu*, Nov., pp. 119–125 (1991).
W. A. Schupp and Yasuhiko, "Data Compression of 3–D Moving Pictures using Adaptive Motion/Disparity Compensation", 1988 Picture Coding Society of Japan Symposium (1988).
Kishino, *Advanced Imaging '92*, pp. 77–87 (1992).

*Primary Examiner*—Wendy Garber
*Attorney, Agent, or Firm*—Morgan & Finnegan, L.L.P.

[57] ABSTRACT

In order to reproduce a stereoscopic image even when the base length or convergence angle between two cameras upon phototaking is difference from that between the naked eyes of an observer upon reproducing, means for extracting parallax information between images obtained by a plurality of cameras, means for symbolizing and recording discriminating information between a double area and single eye areas, intensity information of pixels, and parallax information on the double area in images obtained by the extracting means on a recording medium, and means for storing optical configuration information of the cameras are arranged, and images are reproduced on the basis of the recorded information, the optical disposal information, and optical configuration information upon reproducing.

5 Claims, 13 Drawing Sheets

THREE-DIMENSIONAL IMAGE RECORDING/RECONSTRUCTING METHOD AND APPARATUS THEREFOR

This is a continuation of application Ser. No. 08/263,754, filed on Jun. 22, 1994 now abandoned.

BACKGROUND OF THE INVENTION

1. Field of the Invention

The present invention relates to an image recording/reproducing method and an apparatus therefor and, more particularly, to an image recording/reproducing method which can generate and display a stereoscopic image by processing a plurality of images, and an apparatus therefor.

2. Related Background Art

Conventional methods of taking and recording a stereoscopic image using a plurality of cameras include a method of taking right and left eye images by right and left eye cameras which are separated by a predetermined distance, and symbolizing or coding predicted errors by performing, utilizing one of the right and left eye images which has already been expressed by a normal coding method, similarity evaluation in units of blocks of the other side image (Schupp and Yasuda, 1988 Picture Coding Society of Japan Symposium, 5-1). Simpler methods include a method of synchronously recording the two images on separate tapes or alternately recording the images on a single tape, a method of performing compression-recording of one of right and left eye images by calculating the difference between the right and left eye images (Kishino, Advanced Imaging '92, pp. 77–87), a method of using the difference between one frame and the other frame (to be referred to as an inter-frame difference hereinafter) and the difference between right and left eye images, i.e., a method for calculating inter-frame differences of each of the right and left eye images, performing parallax compensation (a technique for predicting one image from the other image by utilizing the correlation between the right and left eye images) for one image, and coding the difference signals (Izumioka and Watanabe, *Singakugihou*, IE89-1, pp. 1–7, 1989), and the like.

On the other hand, as a method of obtaining stereoscopic image information by taking a certain scene using a plurality of cameras, and displaying the taken image information as a real image in correspondence with the visual characteristics of man, a so-called binocular parallax method is known. In the both eyes parallax method, the cameras are disposed in consideration of the base length and the convergence angle range of the naked eyes to take images, and the taken images are displayed by giving a proper parallax (lateral shift of images) corresponding to an object distance and shape to the right and left eyes (Kumada, *Hosogijitsu*, November, pp. 119–125, 1991).

SUMMARY OF THE INVENTION

However, in the above-mentioned prior art, since parallaxes are not preserved with high accuracy in correspondence with phototaking locations of the two, i.e., right and left eyes, if the base line length or convergence angle of the cameras upon phototaking is different from that of the naked eyes of an observer upon reproducing, a stereoscopic image cannot be correctly displayed.

In order to solve the above-mentioned problem, according to the present invention, means for extracting parallax information between a plurality of images obtained by a plurality of cameras, and means for storing optical configuration information (a base line length, a convergence angle, and the like) of the cameras are arranged. Discriminating information between a double area (e.g., a double area of right and left eye images) and single eye areas (e.g., an area that can be seen by only the right eye) in images obtained as a result of parallax information extraction, pixel intensity information of the areas, and parallax information (a shift vector or a lateral shift position between a pixel of the left eye image and a corresponding pixel of the right eye image) are recorded on a predetermined recording medium. When the images are reproduced on the basis of the recorded information, the images are displayed while giving a proper parallax on the basis of the above-mentioned recorded information, optical configuration information of the cameras, and optical configuration information of the naked eyes upon reproducing, so as to obtain a stereoscopic image even when the base line length of the cameras upon phototaking is different from that of the two eyes upon reproducing.

According to a recording format of the present invention, based on one image information in the double area, the other image information can be reproduced from the parallax information. In general, since a parallax value can be expressed by a considerably smaller number of bits than that required for expressing the luminance value of a pixel, stereoscopic image information can be compressed, and recorded/reproduced.

In a virtual reality (VR) system, a displayed image must be changed in correspondence with a change in visual point position of an observer. However, in the prior art, since images are displayed based on only camera parameter information upon phototaking, when an observer changes his or her view point position with respect to an identical object, an image which correctly reflects a newly occluded portion, a portion which was not seen at the previous position but is now seen for the first time, and the like, cannot be generated, and the prior art cannot be applied to a VR system.

It is another object of the present invention to realize image recording and reproducing with high versatility, which can also be applied to a VR system. In order to achieve this object, a method according to the present invention, comprises:

the step of controlling a position and an optical axis angle of each of a plurality of phototaking means;

the step of storing an optical configuration of each of the plurality of phototaking means;

the step of measuring the position and optical axis angle of each of the plurality of phototaking means;

the step of extracting a parallax in areas or distances to the areas between a plurality of images obtained at different optical disposed patterns of the plurality of phototaking means; and the step of recording image data and distance or parallax data respectively representing the plurality of images and the parallax, wherein an image from a predetermined phototaking position is generated on the basis of the recorded data and optical configuration information of the phototaking means.

According to the present invention, control means for controlling the base line length or convergence angle of each of a plurality of phototaking means positioned at predetermined positions, optical configuration storage means for storing optical configuration data of the phototaking means, measurement means for measuring the base line length or convergence angle, parallax extraction means for extracting a parallax of areas between a plurality of images obtained by the plurality of phototaking means, and recording means for recording the plurality of image data and parallax data, are arranged, and an image from a predetermined phototaking position is generated on the basis of the parallax and optical configuration information of the phototaking means. For this reason, when an observer observes an identical scene (or object) from a visual point different from the optical configuration upon phototaking, or when he or she observes the scene while changing the visual point position, an image different from that upon phototaking, which image correctly reflects the distance between objects and the phototaking unit, the shapes of the objects, and the configuration of the objects, can be generated.

Thus, a correct stereoscopic image which reflects the difference between the camera optical configuration upon phototaking and that of, e.g., the naked eyes upon reproducing, i.e., images which have predetermined parallaxes in correspondence with right and left eye areas, can be generated. Furthermore, even when an observer slightly changes the position or the viewpoint direction with respect to an object in an image, a stereoscopic image can be generated to follow the change.

DETAILED DESCRIPTION OF THE PREFERRED EMBODIMENTS

Prior to the description of the embodiments of the present invention, an image reproducing operation when an optical configuration upon reproducing is different from that upon phototaking, for example, when the base line length of the naked eyes upon reproducing is different from that of cameras upon phototaking, will be explained below.

Figure 4:
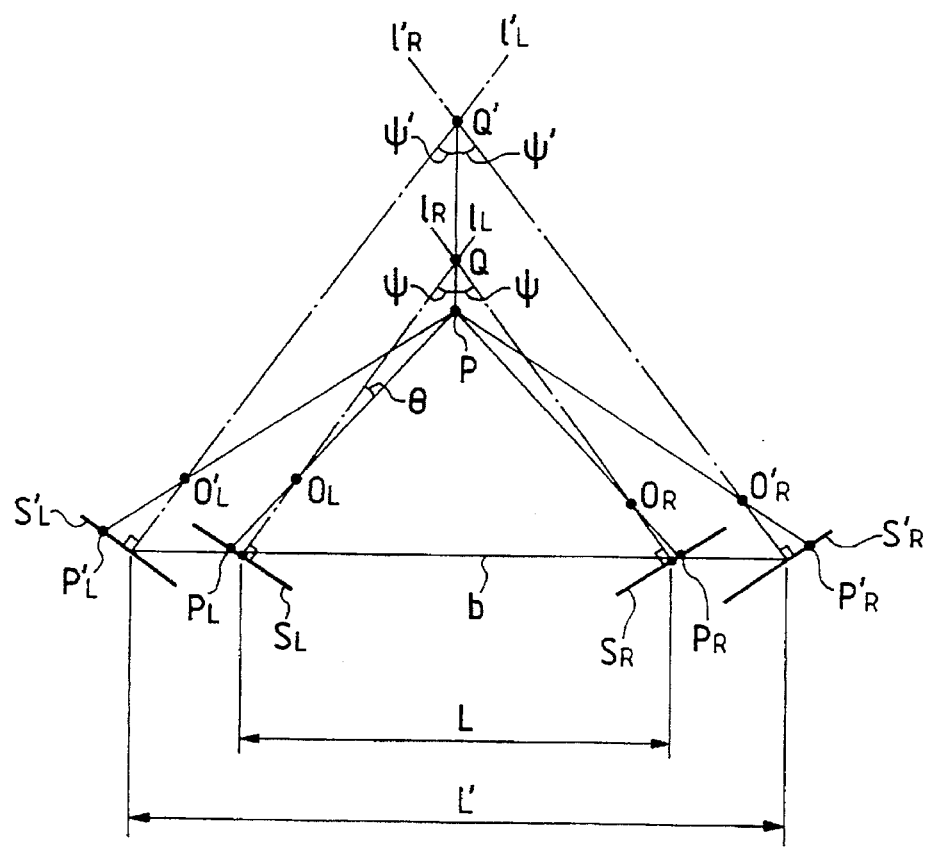
FIG. 4 is an explanatory view of a parallax conversion principle.

FIG. 4 shows the principle of parallax information conversion.

Referring to FIG. 4, $S_L$ and $S_R$ respectively represent the camera sensor surfaces upon phototaking, $S_L'$ and $S_R'$ respectively represent the retinas of naked eyes or display surfaces upon reproducing, and P represents a point on a certain object in a real space. $O_L'$ and $O_R'$ respectively represent the lens centers of left and right phototaking systems upon phototaking, and $O_L'$ and $O_R'$ respectively represent the lens centers of reproducing optical systems (naked eyes) upon reproducing. L and L' respectively represent the base line lengths upon phototaking and reproducing, $P_L$ and $P_R$ respectively represent the imaging positions of the point P on left and right eye camera sensors upon phototaking, and $P_L'$ and $P_R'$ respectively represent the imaging positions of the point P upon reproducing. For the sake of simplicity, assume that the point P is separated from the lens centers $O_L$ and $O_R$ by the same distance, and the lens centers $O_L$ and $O_R$ are separated from the sensor surfaces $S_L$ and $S_R$ by an equal distance u. Assuming that the convergence angle (an angle defined between normals to the sensor surfaces $S_L$ and $S_R$) upon phototaking is represented by $2\psi$, a distance x, in a triangle $O_L PQ$, from an intersection Q of normals $I_L$ and $I_R$ to the sensor surfaces $S_L$ and $S_R$ to the point P in FIG. 4 is calculated as follows.

Since $$\frac{x}{\sin\theta} = \frac{q}{\sin(\pi - \psi - \theta)}$$

$$q = \frac{L}{2\sin\psi} - u$$

then, $$x = \frac{\frac{L}{2\sin\psi_1} - u}{\frac{\cos\psi}{\tan\theta} - \sin\psi} = \frac{\frac{L}{2\sin\psi} - u}{\frac{u\cos\psi}{P_L} - \sin\psi}$$

where $$\tan\theta = \frac{P_L}{u} = \frac{P_R}{u}$$

On the other hand, the point Q is separated from a plane including a base line b by a distance given by:

$$R = \frac{L}{2} \cot\psi$$

Similarly, when the base line length and convergence angle upon reproducing are respectively represented by L' and $2\psi'$, we have:

$$x' = \frac{\frac{L'}{2\sin\psi'} - u}{\frac{2\cos\psi'}{P_L'} - \sin\psi'}$$

-continued $$R' = \frac{L'}{2} \cot\psi'$$

where R' is the distance between a point Q' and the plane including the base line b.

If $P_L'$ is solved using the following relationship:

$$R-x=R'-x'$$

we have:

$$P_L' = f(L, L', \psi, \psi') \quad (1)$$

$$= \frac{u \cos\psi'}{A + \sin\psi'}$$

where $$A = \frac{L' - 2u\sin\psi'}{L'\cot\psi' - L\cot\psi + \frac{L - 2u\sin\psi}{\frac{u\cos\psi}{P_L} - \sin\psi}} \quad (2)$$

Therefore, if the distance u and convergence angle parameter $\psi$ are known, and the imaging position $P_L$ can be measured, $P_L'$ obtained when the base line length changes from L to L' and the convergence angle changes from $2\psi$ to $2\psi'$ can be calculated as a function of L, L', $\psi$, $\psi'$, and the like.

Thus, upon reproducing, L, $\psi$, and the like are read out from a camera optical configuration information recording means 7 (see FIG. 1), optical configuration information, L' and $\psi'$, upon reproducing is similarly detected, and $P_L$ is converted into $P_L'$ in accordance with equations (1) and (2), thus displaying images. Since a parallax upon phototaking is generally given by $P_L$-$P_R$, a parallax upon reproducing changes to $P_L'$-$P_R'$ in correspondence with the change in base line length. As shown in FIG. 4, when an optical system is symmetrical about a plane including PQ, the parallax changes from $2P_L$ to $2P_L'$. When the point P is not separated by an equal distance from the lens centers $O_L$ and $O_R$, i.e., when $|P_L| \neq |P_R|$, $P_R'$ can be calculated from $P_R$ in the same manner as in equations (1) and (2).

Figure 1:
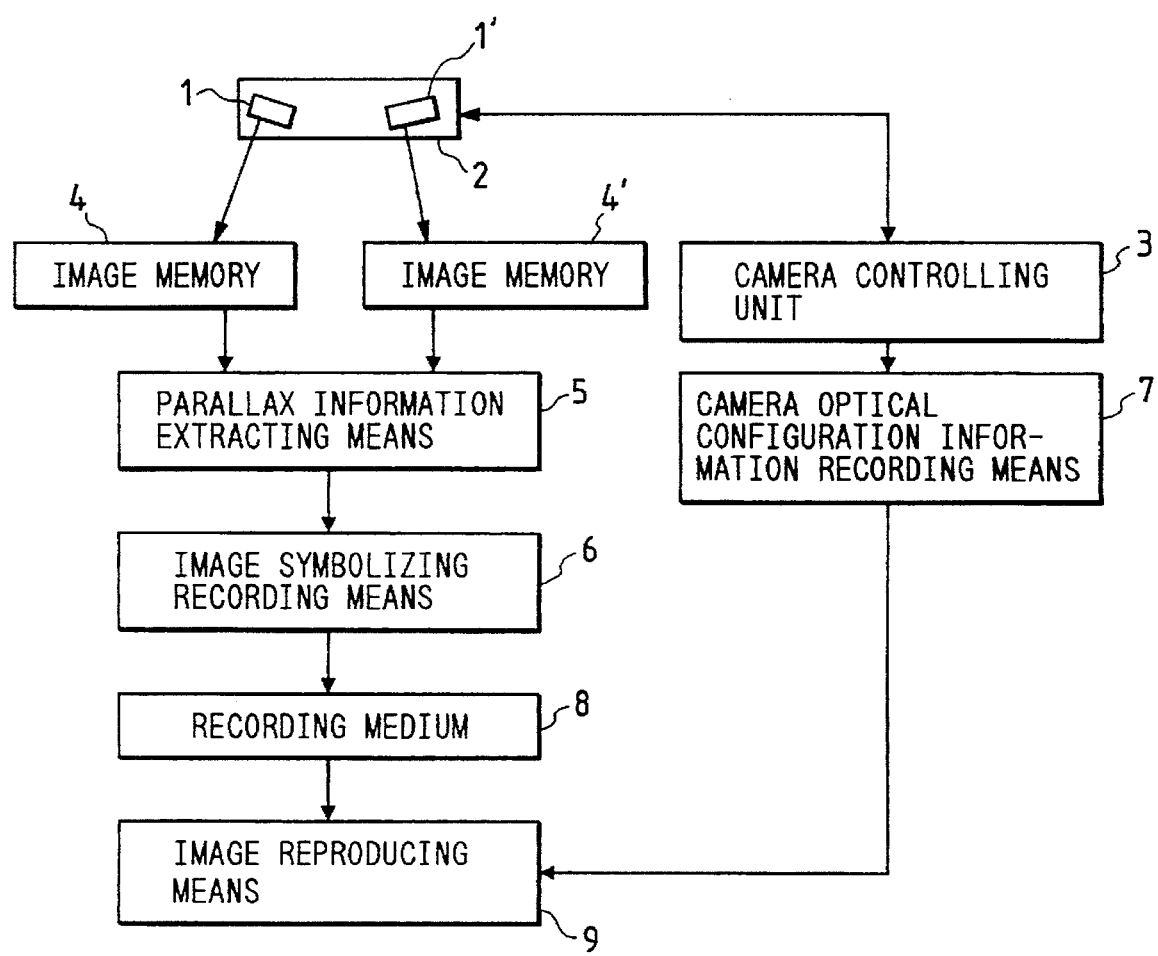
FIG. 1 is a block diagram showing the arrangement of a system according to the first embodiment of the present invention.

FIG. 1 shows the basic arrangement according to the first embodiment of the present invention.

Referring to FIG. 1, an apparatus includes cameras 1 and 1', a mount 2 for the cameras 1 and 1', a camera controlling device 3 for controlling the optical configuration parameters, phototaking mode, and the like of the cameras 1 and 1', image memories 4 and 4' for temporarily storing images from the cameras 1 and 1', a parallax information extracting means 5 for extracting parallax information between two images, an image coding and recording means 6 for symbolizing or coding double/single eye area discriminating information, intensity information, and parallax information of images obtained after parallax information extraction on the basis of a predetermined format, and recording the coded information in a recording medium 8, a camera optical configuration information recording means 7 for recording camera optical configuration information upon phototaking, and an image reproducing means 9 for reading out information recorded in the recording medium 8 and information recorded in the camera optical configuration information recording means 7 upon reproducing, calculating a proper parallax on the basis of luminance data of the right and left eyes, the base line length of the naked eyes upon reproducing on a double area, and the like, and for luminance-displaying images.

The operation of the first embodiment will be described below.

Images from the cameras 1 and 1' are temporarily held in the image memories 4 and 4', and are then input to the parallax information extracting means 5. The parallax information extracting means 5 detects a double area and single eye areas from the two pieces of image information taken by the two cameras, and extracts discriminating information between the double and single eye areas, intensity information of pixels, and parallax information at each point on the double area.

The processing of the parallax information extracting means 5 will be described below. The parallax in two images taken by two cameras is obtained by extracting whether or not the two images include corresponding points. As a method of extracting corresponding points, a method of performing block matching based on a correlation calculation, a least square method, or the like, or matching of features obtained by extracting, e.g., edges in images, and determining corresponding points of remaining areas by interpolation is known. An area where corresponding points are present corresponds to the double area in the present invention, and areas where no corresponding points are present correspond to the single eye areas. For this reason, according to the present invention, as a parallax information extraction method, in addition to a method based on corresponding point extraction, a three-dimensional distance measurement (Sakauchi, Advanced Imaging '92, pp. 1–10) may be performed to obtain distance image information, and thereafter, the distance image information may be converted into parallax information on a camera coordinate system on the basis of the principle of triangulation (Sakauchi, Advanced Imaging '92, pp. 1–10). In this case, the presence/absence of a parallax can be discriminated from the distance information, and double/single eye areas can be determined.

The image coding and recording means 6 encodes double/single eye discriminating information, a pixel intensity value, and a parallax value output from the parallax information extracting means 5, and records the encoded information on the recording medium 8.

On the other hand, the camera optical configuration information recording means 7 records the base line length and convergence angle upon phototaking. Therefore, upon reproducing, the image reproducing means 9 can calculate a proper parallax at each point from the above-mentioned equations on the basis of the double/single eye discriminating information, pixel intensity value, and parallax value read out from the recording medium, and the base line length and convergence angle, hence giving proper stereoscopic images. In this embodiment, the image reproducing means 9 may have a function of detecting the base line length and convergence angle of naked eyes or displays upon reproducing.

Figure 2:
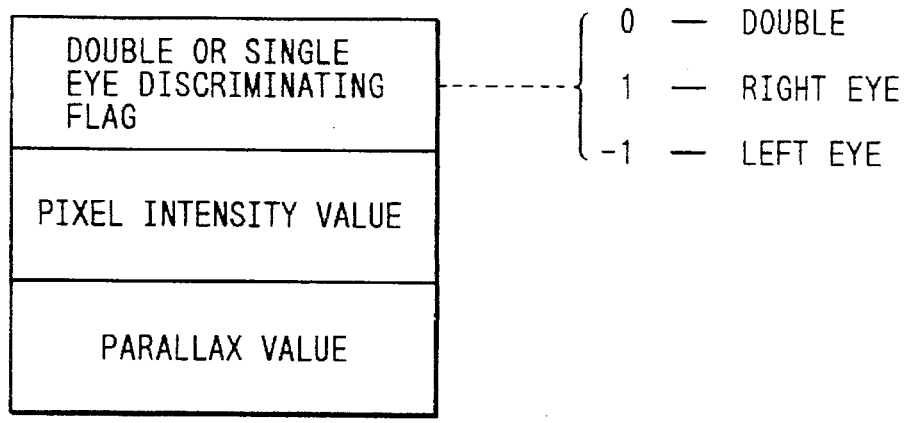
FIG. 2 is an explanatory view of the digital recording format of a pixel value in the first embodiment.

FIG. 2 is an explanatory view showing an example of the recording format in units of pixels in the image coding and recording means 6 of the first embodiment. In FIG. 2, pixel data consists of a flag having double/single eye discriminating information, a pixel intensity value having a predetermined bit length, and a parallax value. For example, a flag value corresponding to the double area is given by 0, and flag values corresponding to the right and left eyes are respectively given by 1 and −1. In this format, when the flag value is 0, the parallax value is always 0. Pixel data of the double area is represented by that of either the right or left eye area. A parallax value is that of a pixel in an area on the side of the other camera with respect to the representative area.

As described above, in this embodiment, the right and left eye images are not respectively written in different areas in the recording medium 8, but a parallax and the right and left eye images for one frame are simultaneously digitally recorded together with discriminating flags.

Figure 3A:
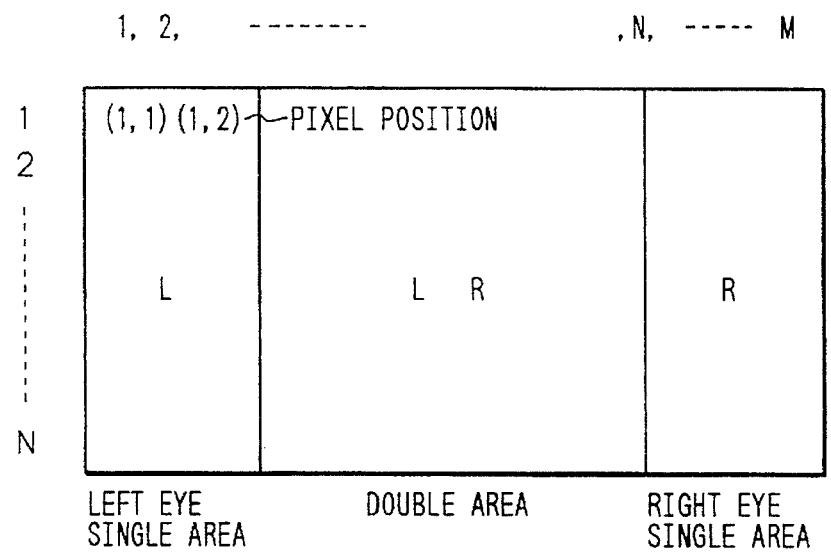
FIGS. 3A and 3B are explanatory views of the single eye areas, double area, and pixel position.

The position of pixel data in one frame shifts from the upper left corner to the upper right corner of a screen (i.e., in the order of (1, 1), (1, 2), ..., (1, M), (2, 1), ..., (2, M), (3, 1), ..., (3, M), ...), as shown in, e.g., FIG. 3A, every time a flag is read out. The size M in the widthwise direction is determined by, e.g., the convergence angle of the cameras, but may be determined based on the widths of the double and single eye areas obtained in parallax information extraction.

Figure 3B:
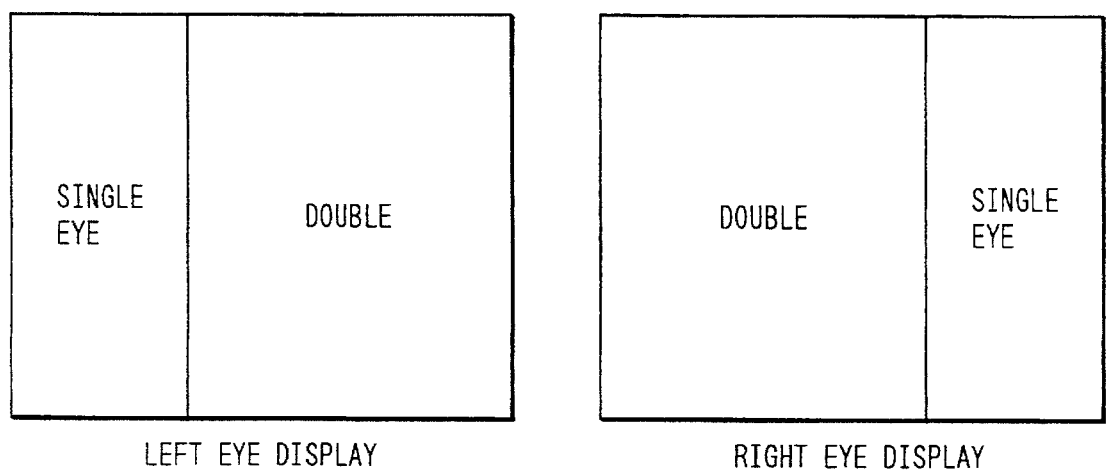

As an image reproducing display, areas visible only to the left eye, to the right eye, and to the both eyes may be time-divisionally displayed on a single screen, as shown in FIG. 3A, and the displayed images may be stereoscopically observed using polarization eye glasses, liquid crystal shutters, or the like. Alternatively, right and left eye images (FIG. 3B) given with a parallax may be displayed using two liquid crystal panels of a head-mount display.

Figure 5:
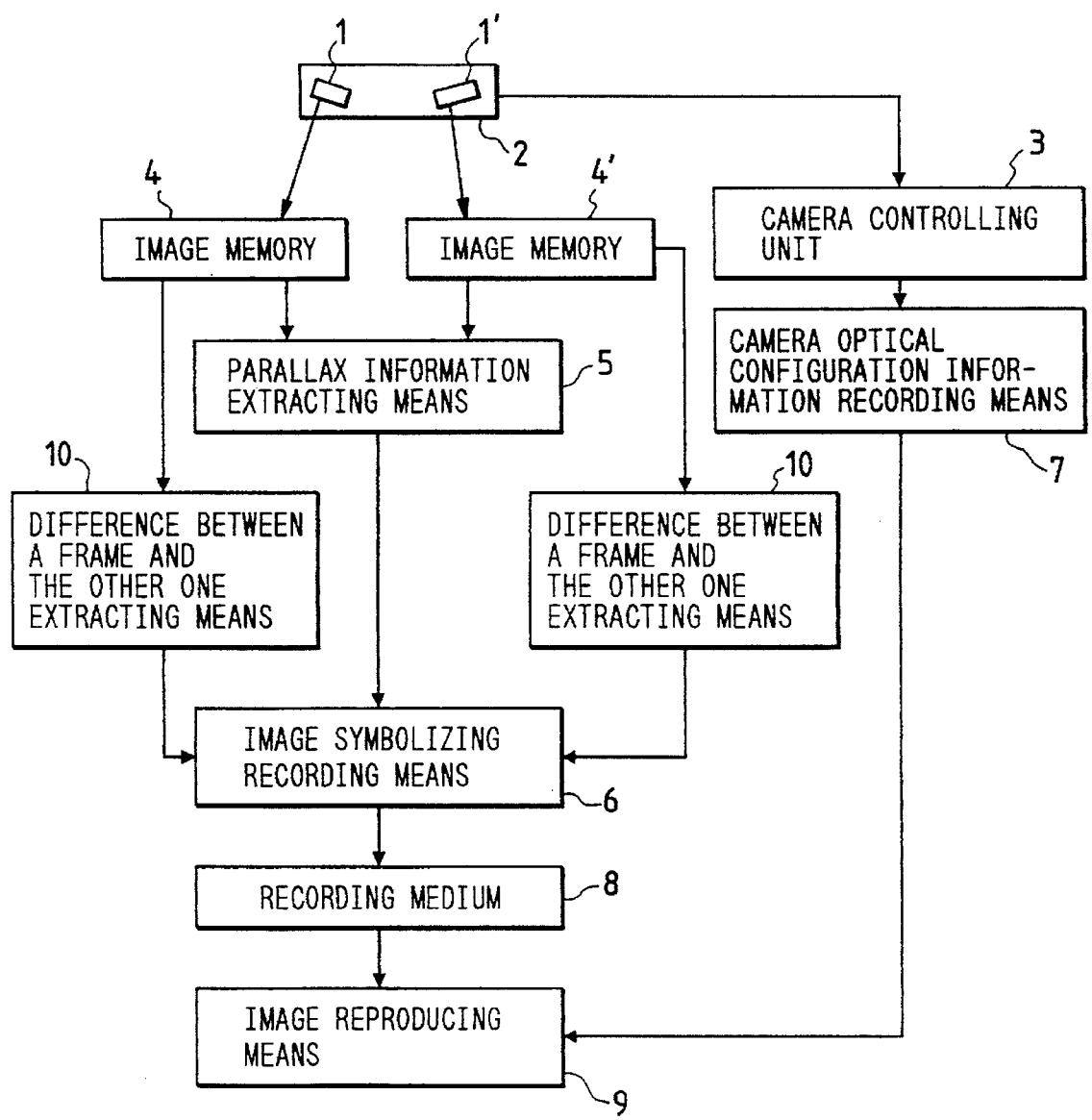
FIG. 5 is a block diagram showing the arrangement of a system according to the second embodiment of the present invention.

FIG. 5 is a block diagram showing the second embodiment of the present invention. In this embodiment, difference between a frame and the other one extracting means (to be referred to as inter-frame difference extracting means hereinafter) 10 and 10' respectively corresponding to the left and right images are added to the arrangement of the first embodiment, thus realizing recording/reproducing of a stereoscopic dynamic image.

Each of the inter-frame difference extracting means 10 and 10' obtains a right or left difference image between images of the current frame and the immediately preceding frame stored in a corresponding one of the image memories 4 and 4'. On the other hand, the parallax information extracting means 5 detects single eye areas and a double area from the two, i.e., right and left images of the current frame, and extracts a parallax of the right and left images at each point on the double area.

Figure 6:
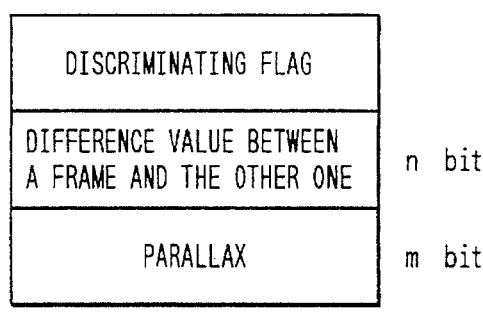
FIG. 6 is an explanatory view of the recording format of the second embodiment.

FIG. 6 shows the digital image recording format of the second embodiment. As in FIG. 2 of the first embodiment, the format includes a double/single eye discriminating flag and a parallax. However, as for the pixel value, a difference from the immediately preceding frame is used. Each information is expressed by a fixed number of bits.

Upon reproducing, in the single eye areas, right and left pixel values in the current frame are desymbolized or decoded using the difference value. In the double area, a pixel value of either the right or left image is similarly decoded using the difference value, and a corresponding pixel and its luminance value of the other image are set on the basis of the parallax as in the first embodiment.

A reproducing method executed when optical configuration information (e.g., the base line length and convergence angle) upon phototaking is different from that upon reproducing is the same as that in the first embodiment.

Figure 7A:
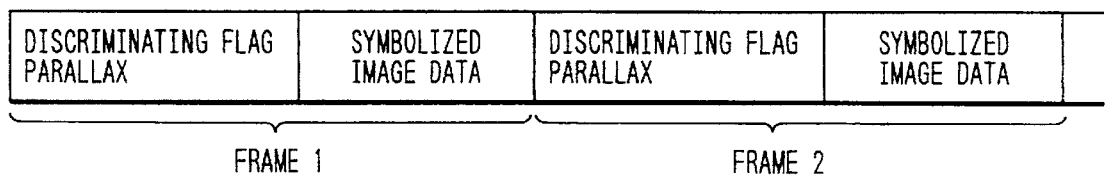
FIGS. 7A and 7B are explanatory views of another recording format.
Figure 7B:
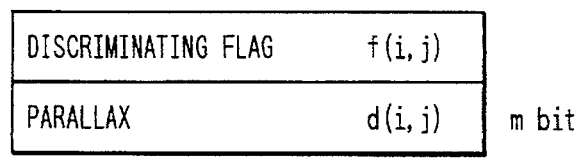

FIGS. 7A and 7B show another stereoscopic image recording format. In this format, a single/double eye discriminating flag f(i, j) (see FIG. 2) and a parallax d(i, j) for each pixel (i, j) obtained by the parallax information extracting means are respectively expressed by a fixed bit length, as shown in FIG. 7B. Luminance data I(i, j) for one frame shown in FIG. 3A is encoded by a general image coding method (e.g., DCT symbolizing, JPEG, MPEG, wavelet transform, or the like), and the encoded data is recorded. The discriminating flag, parallax, and encoded image data are sequentially recorded in units of frames, as shown in FIG. 7A. Upon reproducing, encoded image data is decoded, and the decoded image data is displayed based on the discriminating flag and parallax data as in the first embodiment.

Figure 8:
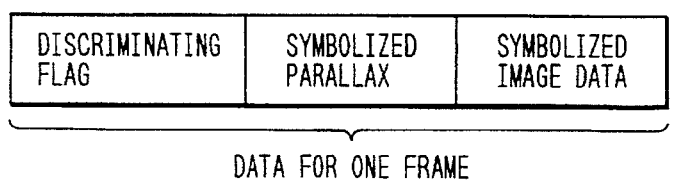
FIG. 8 is an explanatory view of still another format.

FIG. 8 shows still another stereoscopic image recording format. A stereoscopic image shown in FIG. 3A is divided into a discriminating flag, encoded parallax and image data, which are sequentially recorded (however, the recording order is not limited to this as long as it is predetermined).

The encoded parallax is obtained as follows. The parallax of a single eye area is set to, e.g., 0 (this causes no problem since a discriminating flag of each pixel is recorded, and is reflected upon reproducing), the parallax distribution is processed as a kind of image data (distance image), and the parallax distribution is encoded using a general image coding method as is done in FIGS. 7A and 7B.

When a parallax and image data are encoded by a fixed bit length, the encoded data may be recorded in the format shown in FIG. 2.

Note that the camera optical configuration information upon phototaking may be written in advance in a header portion of a recording medium. The present invention is not limited to a specific recording format as long as single/ double eye area discriminating information, decodable image luminance information, and parallax information are recorded.

In recording/reproducing a stereoscopic image, single eye areas and a double area of images from a plurality of cameras are discriminated by the parallax information extracting means, discriminating flags of these areas, luminance information, and parallax information are simultaneously recorded (FIGS. 2, 6, 7A, 7B, 8, and the like) in units of pixels or in units of areas divided by a predetermined size upon recording of an image, and the camera optical configuration information upon phototaking is stored (i.e., the camera optical configuration information is separately recorded in another recording means or an image data recording medium). With this processing, an image can be reproduced while correctly reflecting a change in parallax due to a difference in optical configuration (e.g., the base line length, convergence angle, and the like) between the reproducing and phototaking operations without degrading a proper stereoscopic perception.

When an image of one of the right and left cameras on the double area is reproduced based on the parallax value which requires a smaller number of bits than that required for the luminance value, image data can be compressed. Thus when the right and left images are compressed not on the basis of the difference between the right and left images as a whole but a parallax at each point of images, images can be reproduced without a proper stereoscopic perception.

In this embodiment, images may be reproduced without providing a parallax, thus obtaining a two-dimensional panoramic image.

Figure 9:
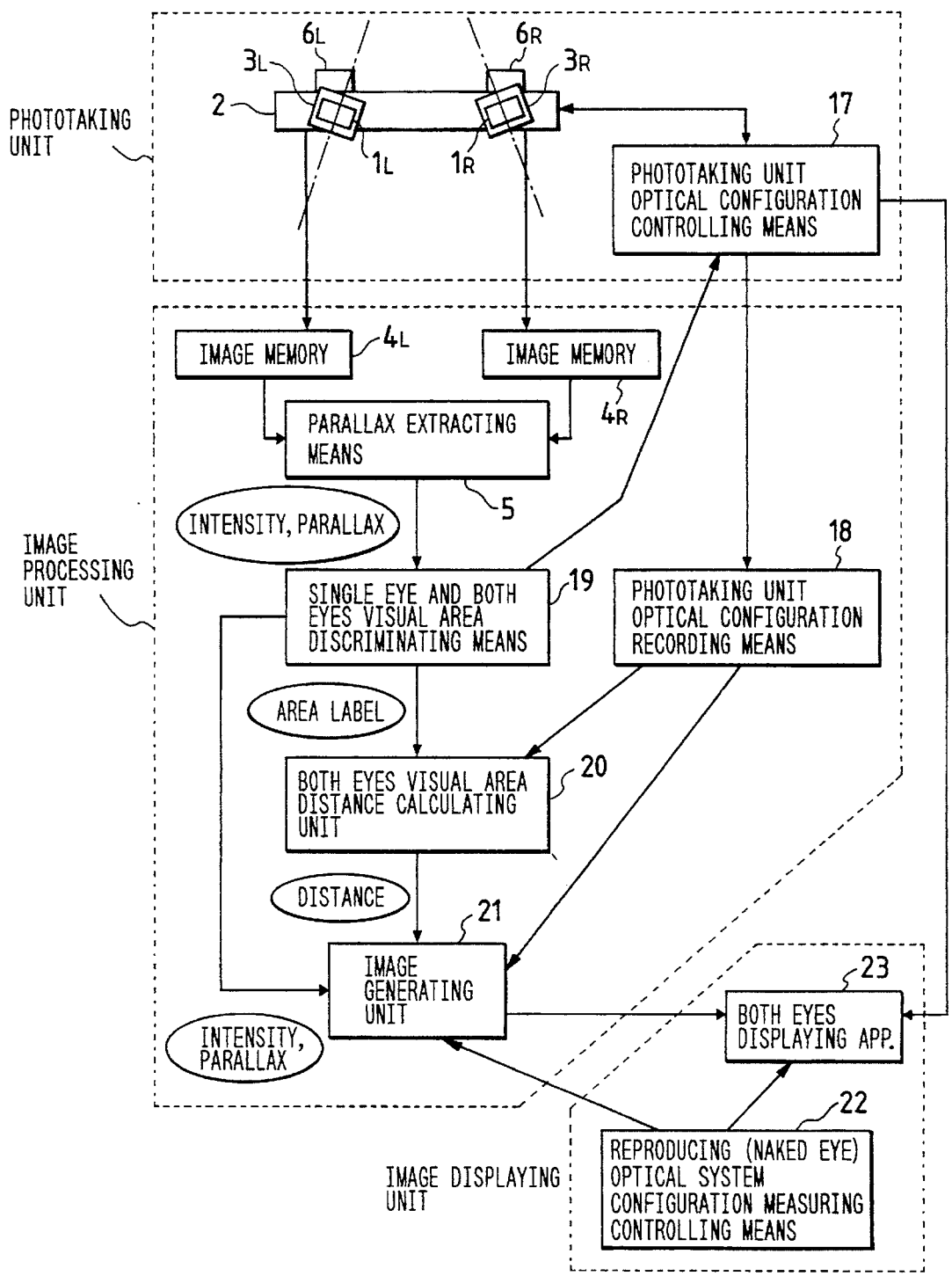
FIG. 9 is a block diagram showing the arrangement of a system according to the third embodiment of the present invention.

FIG. 9 is a block diagram showing the arrangement of a system according to the third embodiment of the present invention. The system of this embodiment comprises a phototaking unit, an image processing unit, and an image displaying unit, which can be separated from each other. These units exchange data, control signals, and the like with each other when they are separated from each other.

Referring to FIG. 9, the system includes left and right cameras $1_L$ and $1_R$, a stage 2 for mounting the cameras, and optical axis direction measuring and controlling means $3_L$ and $3_R$ for controlling the convergence angle of the cameras $1_L$ and $1_R$.

The system also includes position measuring and controlling means $6_L$ and $6_R$ for the stage 2 which mounts the cameras $1_L$ and $1_R$. The means $6_L$ and $6_R$ measure the base line length or the like of the right and left cameras to control the position of the cameras. The system further includes image memories $4_L$ and $4_R$ for temporarily storing image data from the cameras $1_L$ and $1_R$, a parallax extracting means 5 for extracting a parallax of the two, i.e., right and left images, and a controlling means 17 of optical configuration in the phototaking unit for generating commands for adjusting the phototaking unit to a desired configuration on the basis of camera optical configuration information from the optical axis direction measuring and controlling means $3_L$ and $3_R$ and the longitudinal direction position measuring controlling means $6_L$ and $6_R$, and outputting camera optical configuration information to an optical configuration recording means 18. A discriminating means 19 for area visible to single eye and area visible to both eyes discriminates an area where corresponding points of right and left images are present, and an image area taken by only the right or left eye camera on the basis of a parallax value obtained by the parallax extracting means 5, and performs labeling.

Single eye's and both eyes' visible area information obtained by the single eye's and both eyes' visible area discriminating means 19 is supplied to the optical configuration controlling means 17 of the phototaking unit, and is used for controlling the camera positions and the optical axis direction so as to change visible area size to the both eyes. A both eyes' visible area distance calculating unit 20 calculates distance information between the both eyes' visible area and the camera optical systems on the basis of information from the camera optical configuration recording means 18 and label information from the area discriminating portion 19.

An image generating unit 21 generates a stereoscopic image obtained for the optical configuration upon reproducing, using information from a reproducing (naked eyes) optical configuration measuring and controlling means 22, optical configuration information from the recording means 18, and distance information of the both eyes visible area obtained by the calculating unit 20, and outputs right and left images to a stereoscopic or binocularly displaying apparatus (display) 23.

The stereoscopic displaying apparatus 23 can transmit a control command for changing the phototaking unit's optical configuration to the optical configuration controlling means 17, and can directly receive optical configuration information (the base line length, convergence angle, and the like) of the phototaking unit from the optical configuration controlling means 17. The former's function is used when an optical disposal parameter such as a base line length of naked eyes upon observation of the stereoscopic displaying apparatus 23 by an observer is measured using measuring means, and the phototaking unit is controlled to have the same optical configuration as that of the observer, or when an observer controls the phototaking unit so as to take an image at a desired magnification and a desired view point position. The latter's function is used when images are displayed under the same optical configuration conditions as those upon phototaking.

The arrangements of the phototaking unit, the image processing unit, and the image displaying unit are not limited to those shown in FIG. 9. For example, the phototaking unit's optical configuration recording means 18 may be included in the phototaking portion or the image displaying unit. The area discriminating unit 19, the distance calculating unit 20, and the image generating unit 21 may constitute an independent image generating unit. In addition, a communication unit for transmitting/receiving data and commands may be provided to each of the phototaking unit, the image processing unit, and the image displaying unit.

A change in the single eye visible area (an image area taken by only one of the right and left eye cameras) and a change in the both eyes visible area in correspondence with a camera configuration controlling operation of this embodiment will be described below with reference to FIG. 10.

Figure 10:
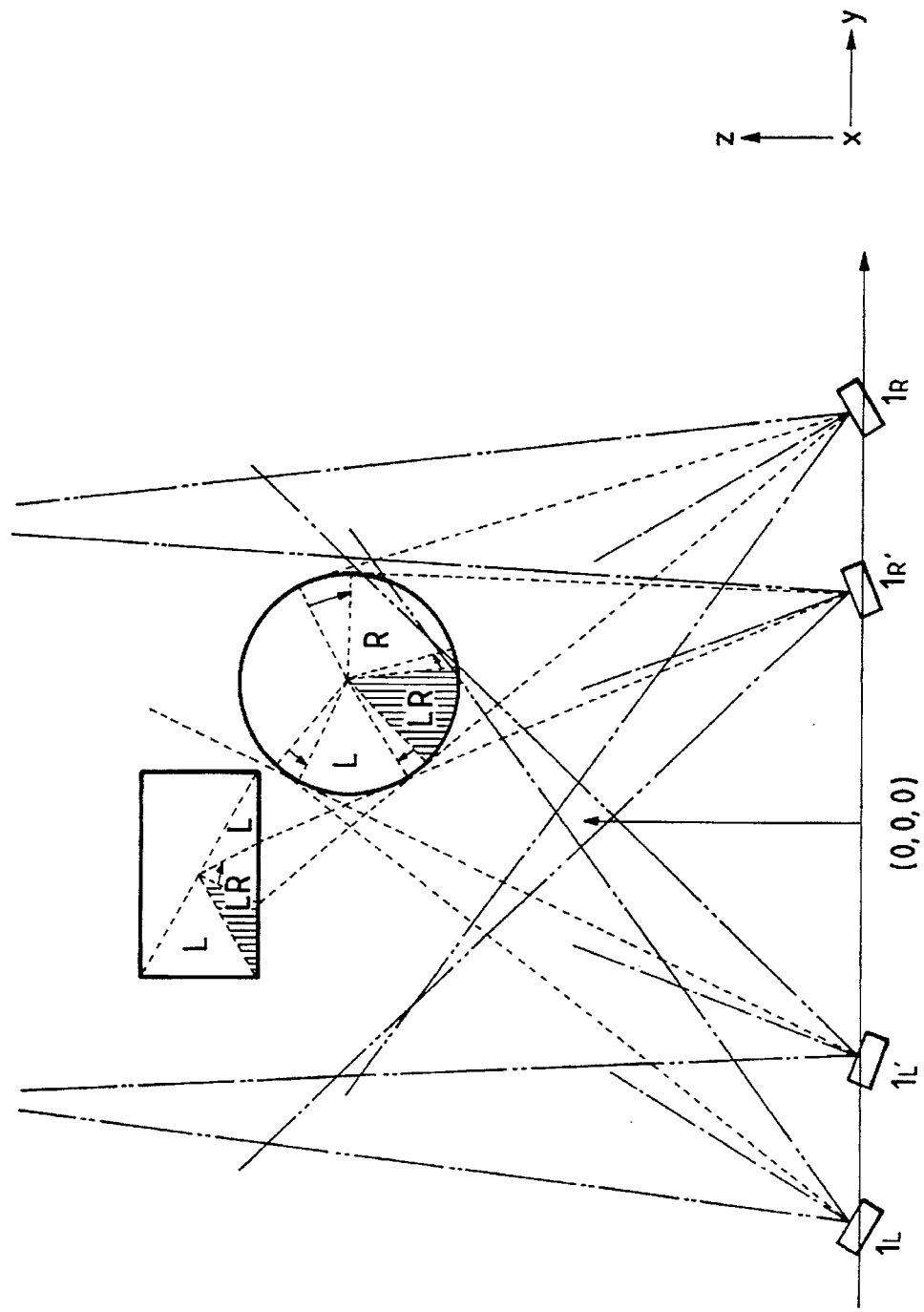
FIG. 10 is an explanatory view of the single eye and both eyes visible areas of the third embodiment.

In FIG. 10, L and R represent single eye visible areas which are respectively taken by only the left and right cameras, and LR represents a both eyes visible area. As shown in FIG. 10, when the left and right cameras $1_L$ and $1_R$ change their positions to $1_L'$ and $1_R'$, respectively, the both eyes visible area LR is enlarged and the single eye visible areas L and R are reduced. In this configuration control, the base line length of the two cameras (i.e., the distance between the camera centers) is shortened to decrease the convergence angle (an angle defined by the optical axes of the two cameras). In FIG. 10, an alternate long and short dashed line indicates the camera optical axis, an alternate long and two short dashed line indicates the field range of each camera, and a dotted line indicates the occluded edge direction.

In this embodiment, the parallax extracting means 5 extracts a parallax (lateral shift) between corresponding points in areas (or points) in two images taken at a predetermined camera configuration.

As conventional methods of parallax extraction, a correlation method which divides an image into blocks, and obtaining points (or blocks) giving maximum correlation values in units of blocks, a method of extracting feature points such as edges in an image, achieving correspondences between feature points in the right and left images, and estimating a parallax using interpolation for the remaining area, and the like are known.

In this embodiment, an extraction method is not particularly limited to the above methods as long as corresponding points (or a parallax) can be extracted. In the process of parallax extraction, an area where corresponding points are present, and areas where no corresponding points are present are found. The former area corresponds to the both eyes visible area, and the latter areas correspond to the single eye visible areas.

In this embodiment, after parallax extraction is executed by the parallax extracting means 5, the single eye and both eyes visible area discriminating unit 19 labels areas which can be respectively seen by only the right eye, both eyes, and only the left eye in units of points (or areas divided in advance) in images. The image generating unit 21 generates an image at an intermediate camera configuration on the basis of the labels.

Figure 11:
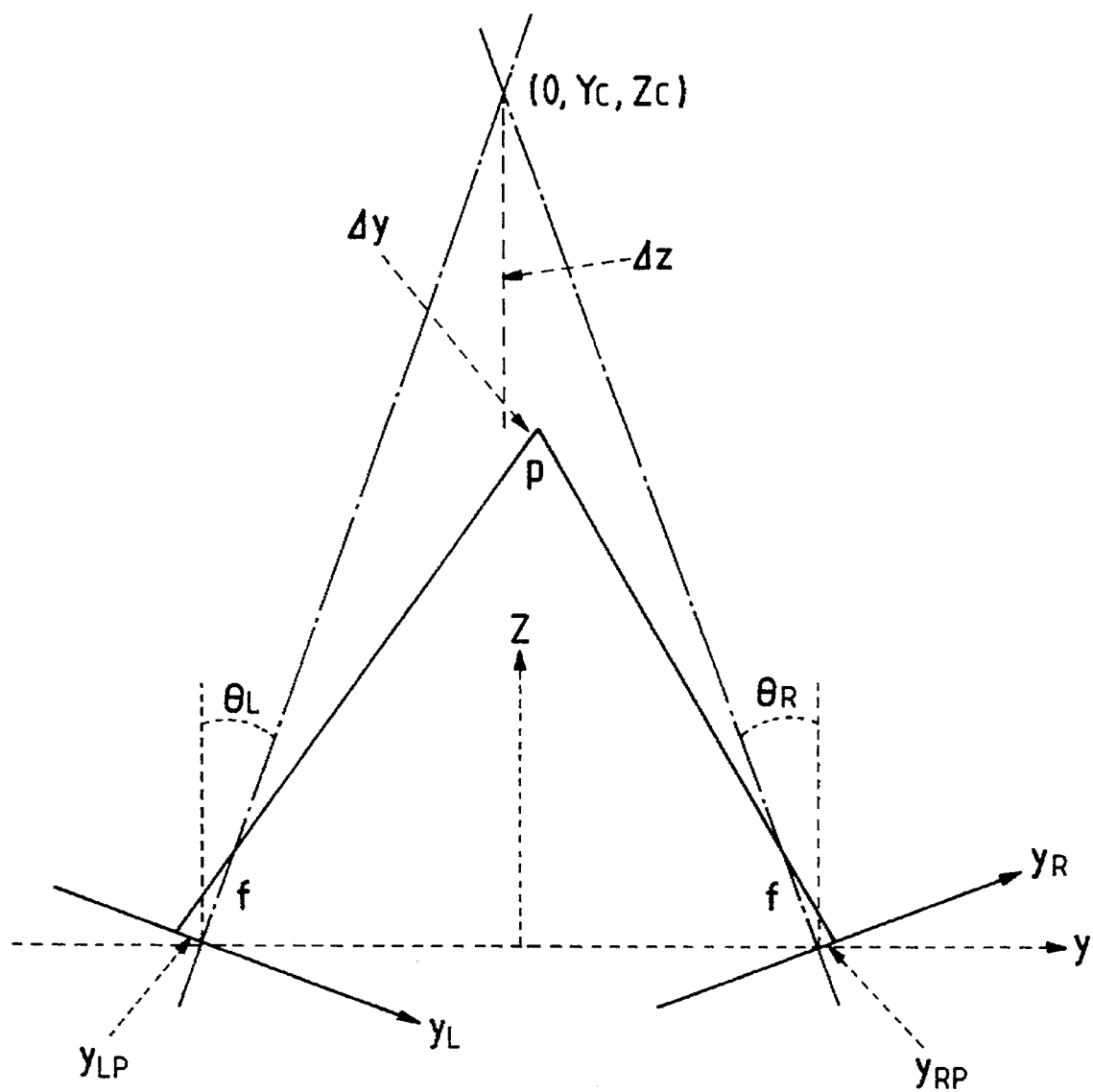
FIG. 11 is an explanatory view of parameters used in a distance calculating unit.

A process for calculating a distance to an object on the basis of the parallax in the both eyes visible area, and the base line length, convergence angle, and the like of the phototaking unit according to this embodiment will be described below with reference to FIG. 11.

The center of a common coordinate system (X, Y, Z) is set at a middle position of the base line of the left and right cameras $1_L$ and $1_R$ on the stage 2 shown in FIG. 9, and the directions of the coordinate axes are defined, such that the Y direction is defined as the base line direction, the Z direction is defined as the depth (distance) measuring direction, and the X direction is defined as a direction perpendicular to the Y and Z directions, as shown in $Fi_G$. 10.

Coordinate systems ($x_L$, $Y_L$, $z_L$) and ($x_R$, $y_R$, and $z_R$) are respectively set on the cameras, so that the center of each coordinate system substantially coincides with the intersection between the optical axis and imaging plane, and the x-y plane substantially coincides with the focal plane. Assume that imaging points, on these camera coordinate systems, of a point p (X, Y, Z) on an object present in the both eyes visible areas are respectively represented by ($x_{LP}$, $Y_{LP}$) and ($x_{RP}$, $Y_{RP}$), the distance between the left camera position (0, $-b/2$, 0) and the right camera position (0, $b/2$, 0) on the common coordinate system on the stage, i.e., the base line length, is represented by b, the optical axis angles of the left and right cameras are respectively represented by $\theta_L$ and $\theta_R$, and the convergence angle is represented by $\theta$ ($=\theta_L+\theta_R$). The position ($X_c$, $Y_c$, $Z_c$) of an intersection C of the two camera optical axes on the common coordinate system is given by the following equations:

$$X_c=0 \quad (11\text{-}a)$$

$$Y_c=(-b/2)\cdot[\tan(\pi/2-\theta_L)+\tan(\pi/2+\theta_R)]/[\tan(\pi/2-\theta_L)-\tan(\pi/2+\theta_R)] \quad (11\text{-}b)$$

$$Z_c=[-b\tan(\pi/2-\theta_L)\tan(\pi/2+\theta_R)]/[\tan(\pi/2-\theta_L)-\tan(\pi/2+\theta_R)] \quad (11\text{-}c)$$

Assuming that the point P is located at (0, $Y_c+\Delta y$, $Z_c+\Delta z$), the following equation can be obtained for the imaging point ($x_{LP}$, $y_{LP}$) of the left camera:

$$(y_{LP})/\{(\Delta y/\cos\theta_L)+[(\Delta z-\Delta y\tan\theta_L)\sin\theta_L]\}=f/\{(Z_c/\cos\theta_L)-[(\Delta z-\Delta y\tan\theta_L)\sin\theta_L]\} \quad (12)$$

Similarly, the following equation can be obtained for the imaging point ($x_{RP}$, $y_{RP}$) of the right camera:

$$y_{RP}/\{(\Delta y/\cos\theta_R)+[(\Delta z-\Delta y\tan\theta_R)\sin\theta_R]\}=f/\{(Z_c/\cos\theta_R)-[(\Delta z-\Delta y\tan\theta_R)\sin\theta_R]\} \quad (13)$$

When equations (12) and (13) are simultaneously solved for $\Delta y$ and $\Delta z$, we have:

$$\Delta z=Z_c\{y_{RP}(f\cos^2\theta_L-y_{LP}\sin^2\theta_L)-y_{LP}(f\cos^2\theta_R)\}/A \quad (14)$$

$$\Delta y=\{y_{LP}Z_c/\cos\theta_L-\Delta z(f+y_{LP})\sin\theta_L\}/\{f\cos\theta_L-y_{LP}\tan\theta_L\sin\theta_L\} \quad (15)$$

where $$A=\tfrac{1}{2}\{[(f\cos^2\theta_L-y_{LP}\sin^2\theta_L)(f+y_{RP})\sin\theta_R/2]-[(f\cos^2\theta_R-y_{RP}\sin^2\theta_R)(f+y_{LP})\sin\theta_L/2]\} \quad (16)$$

Therefore, if $y_{LP}$, $y_{RP}$, f, $\theta_L$, $\theta_R$, and b are known or can be measured, the position (0, $Y_c+\Delta y$, $Z_c+\Delta z$) of the point p can be calculated using equations (11-a) to (11-c), (14), (15), and (16). In place of the above-mentioned processing, another image processing method or distances to points (areas) of images based on an optical distance measuring method may be used.

In this embodiment, the distance information (three-dimensional shape information) in the both eyes visible area in images of an object is calculated under conditions of different base line lengths or convergence angles, thereby generating images at an intermediate optical configuration of the two or more phototaking optical configurations i.e., from arbitrary visual points having a base line length or convergence angle between $1_L$ and $1_L'$ (or between $1_R$ and $1_R'$).

For example, distance information, based on a parallax from a phototaking system or point correspondence in a hatched portion in FIG. 10 is calculated from images taken when the left and right cameras are arranged at positions $1_L'$ and $1_R'$ (a base length b and a convergence angle $\theta$) in FIG. 10, and distance information in the both eyes visible area which is expanded in the direction of an arrow is calculated from images taken when the left and right cameras are disposed at positions $1_L'$ and $1_R'$ (a base length b' and a convergence angle $\theta'$; b'<b and $\theta'<\theta$). Then, the stereoscopic displaying apparatus 23 converts images on the both eyes visible area observed at an intermediate optical configuration (a base line length $b_M$ and a convergence angle $\theta_M$; b'<$b_M$<b and $\theta'<\theta_M<\theta$) to have a correct parallax value, and outputs converted images.

In order to show the validity of the parallax conversion principle, problems posed if images are reproduced based on only one camera disposal will be discussed below.

(i) It is difficult with only images taken at disposed patterns $1_L$ and $1_R$ to display the entire both eyes visible area at $1_L'$ and $1_R'$ or at intermediate positions therebetween while giving a correct lateral shift corresponding to a parallax to the positions of pixels on corresponding areas on the left and right eye displays of the displaying apparatus 23 on the basis of the distance information. In addition, it is not easy to predict a change in size and shape on the single eye areas.

(ii) Based on only images taken at the $1_L'$ and $1_R'$ the both eyes visible area at the camera position $1_L$ and $1_R$ or at their intermediate disposed patterns can be displayed on the both eyes displaying apparatus 23 to have a correct parallax. However, it is not easy to predict the sizes, intensity distributions, and the like of expanded portions on the single eye visible areas, i.e., of certain ranges of portions covered by arrows on a non-hatched area in FIG. 10.

Figure 12A:
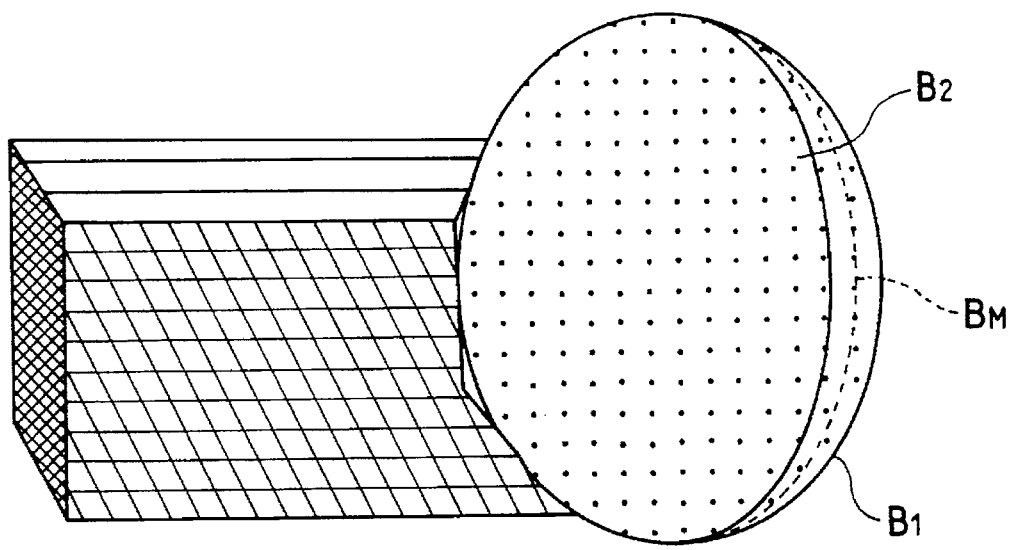
FIGS. 12A and 12B are explanatory views showing a setting state of boundary lines at an intermediate camera configuration in the fourth to sixth embodiments of the present invention.
Figure 12B:
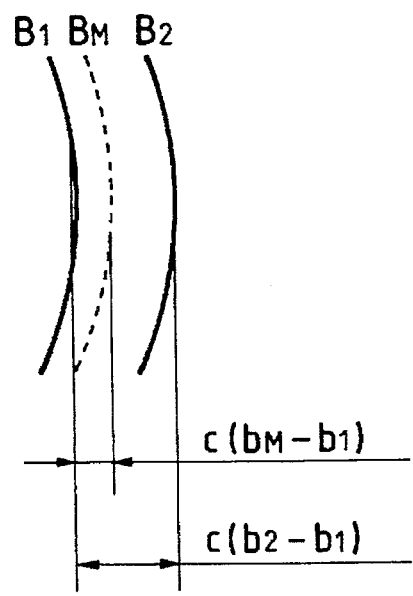
Figure 12C:
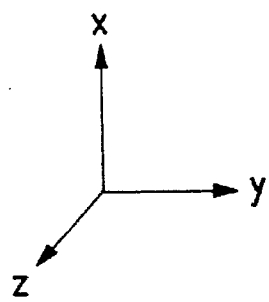
FIG. 12C is a view showing the coordinate axes used upon explanation of FIGS. 12A and 12B in the same paper.

In order to solve these problems, in this embodiment, based on images taken at two different camera configurations having different base line lengths and convergence angles, images on single eye visible areas at an intermediate configuration between these two configurations are predicted, and images on the both eyes visible area are correctly displayed. The sizes and intensity distributions on the single eye visible areas of an identical object are predicted by extracting a portion of an image having a large single eye visible area size using a value $b_M$ of the base length at the intermediate configuration and optical axis angles $\theta_L^M$ ($\theta_L'<\theta_L^M<\theta_L$) and $\theta_R^M$ ($\theta_R'<\theta_R^M<\theta_R$) of the cameras when the field angles of the camera are sufficiently large. More specifically, images obtained under the camera optical axis angles $\theta_L$ and $\theta_R$ and the base line length b or under the camera optical axis angles $\theta_L'$ and $\theta_R'$ and the base line length b' are converted into images of $\theta_L=\theta_R=0$ by coordinate conversion (rotation, projection, and the like), and thereafter, the boundary position of a single eye visual area is partitioned to $B_M$ based on $B_1$ and $B_2$ in FIGS. 12A and 12B at a ratio of $b_M$ $-b'/b$ $-b'$. In FIG. 12B, c is a proportion constant. The boundary position may be calculated by nonlinear interpolation such as a spline function on the basis of extracted distance information. Furthermore, coordinate conversion is performed to obtain images corresponding to camera optical axis angles $\theta_L^M$ and $\theta_R^M$. In this embodiment, if coordinate conversion processing of camera images upon a change in camera optical axis angle is not included, a correction effect reflecting the difference between an optical system disposal upon phototaking and that upon reproducing may be provided.

Figure 13:
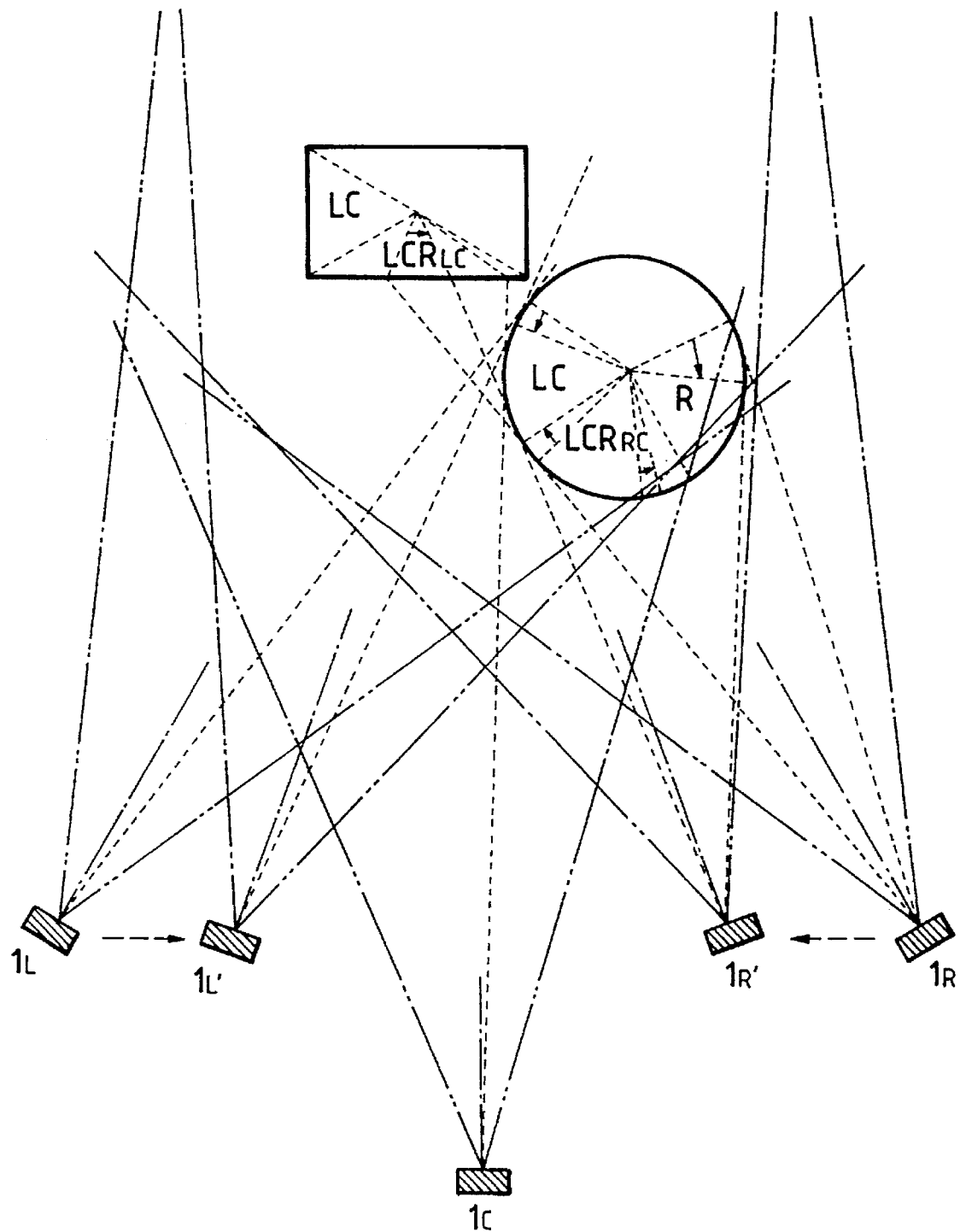
FIG. 13 is a view showing a camera optical configuration of the fourth embodiment.

FIG. 13 shows three camera disposed patterns, and single, double, and triple eyes visible areas in the fourth embodiment of the present invention.

In this embodiment, an image of a single object is taken by three, i.e., left, central, and right cameras ($1_L$, $1_c$, and $1_R$) from roughly the same viewing direction as in the third embodiment. In FIG. 13, L, LC, LCR, RC, and R respectively represent a left camera single eye visible area, a left-central camera double eyes visible area, a triple eyes visible area, the central-right camera double eyes visible area, and a right camera single eye visible area. FIG. 13 also illustrates changes in single, double, and triple eyes visible areas when the left and right cameras $1_L$ and $1_R$ perform phototaking operations while changing the base line length and convergence angle with respect to the central camera $1_c$ as in the third embodiment.

Note that the moving directions of the left and right cameras $1_L$ and $1_R$ correspond to the base line direction or paths predetermined at their initial positions.

In this embodiment, distance or three-dimensional shape information for an identical object is obtained by the same parallax extraction method as in the third embodiment by taking an image of the object using the three cameras at a plurality of (a finite number of) phototaking system configurations including movement and a change in optical axis angle (a change in convergence angle) of arbitrary two of these cameras. Upon reproducing, even at a different view point position or optical system configuration from that upon phototaking, images according to the three-dimensional shape and configuration of the objects are generated as long as the visual field range falls within that upon phototaking. In particular, as compared to the third embodiment, the extractable range of the distance or three-dimensional shape information is enlarged. More specifically, even when the movable ranges of $1_L$ and $1_R$ remain the same, a double eyes visible area defined by the central camera and either the left or right camera is expanded as a new distance information extractable area. Furthermore, using images taken at a plurality of (a finite number of) camera configurations including camera movement in the base line direction between $1_L$ and $1_c$ or between $1_R$ and $1_c$ and a change in camera optical axis angle (or convergence angle), the distance or three-dimensional shape extraction range can be expanded, and images can be generated from a reproducible intermediate camera configuration.

Figure 14:
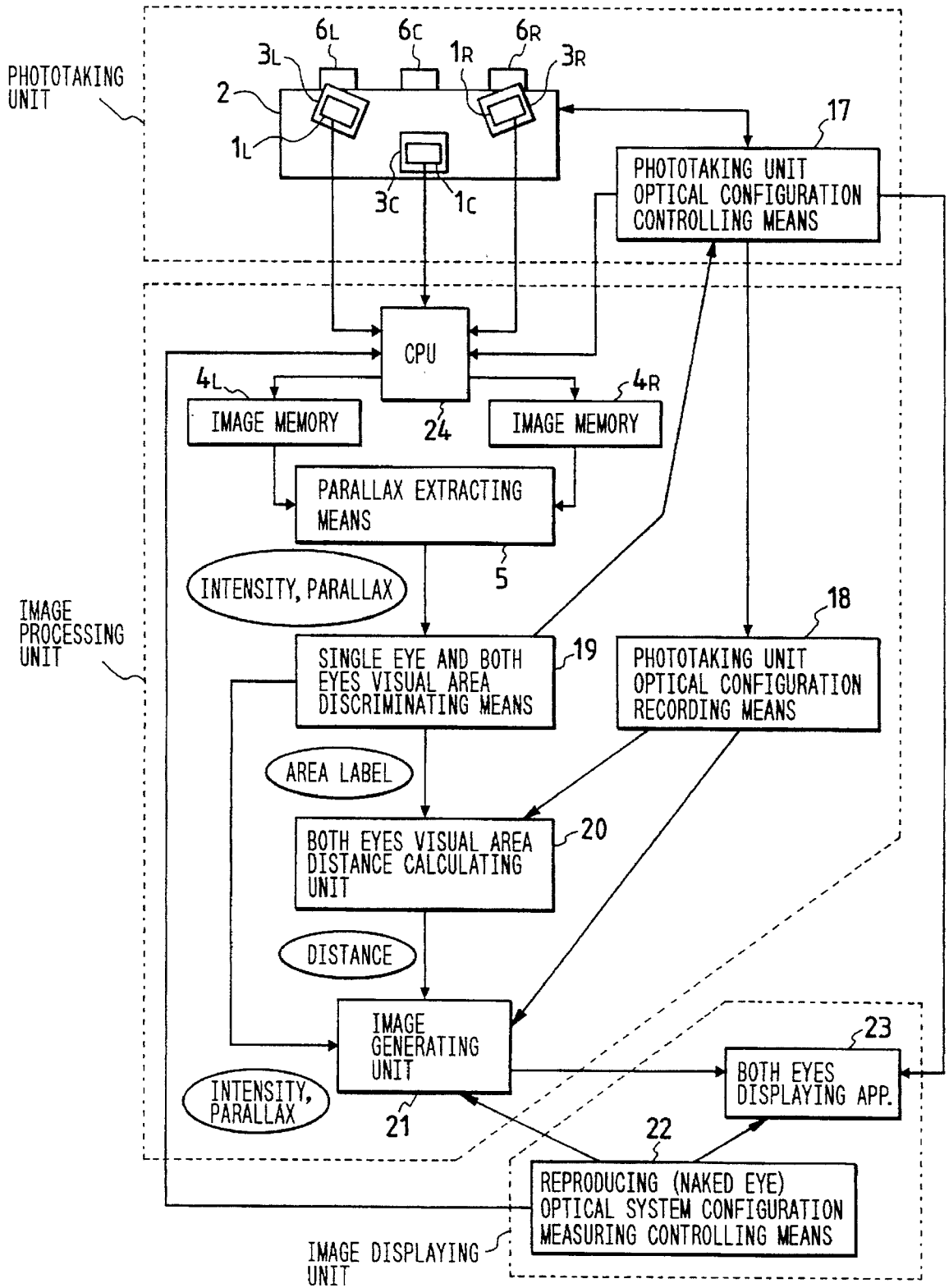
FIG. 14 is a block diagram showing the arrangement of a system of the fourth embodiment.

FIG. 14 is a block diagram showing the arrangement of a system of this embodiment. The system shown in FIG. 14 includes an optical axis angle measuring and controlling means $3_c$ and a camera position measuring and controlling means $6_c$ for the central camera $1_c$. A CPU 24 serves as a computing means for processing image data and camera configuration information of the left, right, and central cameras. The CPU 24 receives a state of an observer who wears a stereoscopic displaying apparatus 23 (e.g., a head-mount display), i.e., information such as the position, posture, visual axis direction, and the like of the observer, from a reproducing optical system configuration measuring and controlling means 22, selects image data from two appropriate cameras in accordance with such information, and temporarily records the selected image data in image memories 4 and 4'. The following processing is the same as that in the third embodiment.

A method of selecting image data from a phototaking portion by the CPU 24 will be explained below.

When an observer sends a reset signal (e.g., pressing a reset button) from the stereoscopic displaying apparatus 23, the reproducing optical system configuration measuring and controlling means 22 measures the base line length of the naked eyes, and supplies base line length data and the reset signal to the CPU 24. At this time, image data from two cameras at a camera configuration closest to the received base line length, or image data from two cameras corresponding to a predetermined visual axis direction, are selected. Note that in the latter case, the base line length data of the naked eyes of the observer need not be used. The distance between the object and a virtual object at that time is assumed to be an integer multiple (normally, 1) of the distance to an object upon phototaking of the cameras. When the observer changes his or her position, posture, visual axis direction, and the like from the reset state, the measuring controlling means 22 detects these data using a gyro, magnetic sensor, or the like arranged in the displaying apparatus 23, and sends properly scaled values to the CPU 24. The CPU 24 judges, in consideration of scaling coefficients, whether or not the position, posture, and the like of the observer fall within the view point position range and the visual axis direction (optical axis angle) range covered by the camera configuration upon phototaking. For example, assume that the observer observes an object in the visual axis direction defined by the cameras $1_L$ and $1_c$ at the reset position. More specifically, assume that the barycentric positions of the naked eyes coincide with those of the cameras $1_L$ and $1_c$ (base line lengths need not always coincide with each other), and the gazing point position and the direction of the left and right eyes substantially coincide with the gazing point (crossing point of the optical axes) position and direction of the cameras $1_L$ and $1_c$. The CPU 24 determines that the position and visual axis direction corresponding to an intermediate configuration between two camera positions at which images are taken in advance, i.e., disposed patterns $1_L$ and $1_c$, and $1_L'$ and $1_c'$, can be displayed when the position, visual axis direction, and the like of the observer change from the above-mentioned state to those falling within a visual field angle range (indicated by an alternate long and two short dashed line) covered by the two camera configurations. Then, images are generated from those at the two phototaking configurations by the same method as in the third embodiment. If the observer changes his or her state to one outside the displayable range, images at a phototaking disposal closer to $1_L$ and $1_c$, or $1_L'$ and $1_c'$ may be displayed.

As can be seen from the above description, as a larger number of phototaking configurations are set in advance, the displayable range upon a change in state of the observer is enlarged. In this case, image data corresponding to the number of phototaking configurations×2 should be stored (recorded) (FIG. 13 is equivalent to a case wherein six phototaking disposed patterns ($1_L$, $1_c$), ($1_L'$, $1_c$), ($1_c$, $1_R$), ($1_c$, $1_R'$) ($1_L$, $1_R$), and ($1_L'$, $1_R'$) are set). Note that images with a proper parallax between the right and left eyes are generated and displayed when a stereoscopic image is displayed on the binocular display. In this embodiment, two-dimensional images from different visual point positions within a predetermined range can be generated, as a matter of course.

Figure 15:
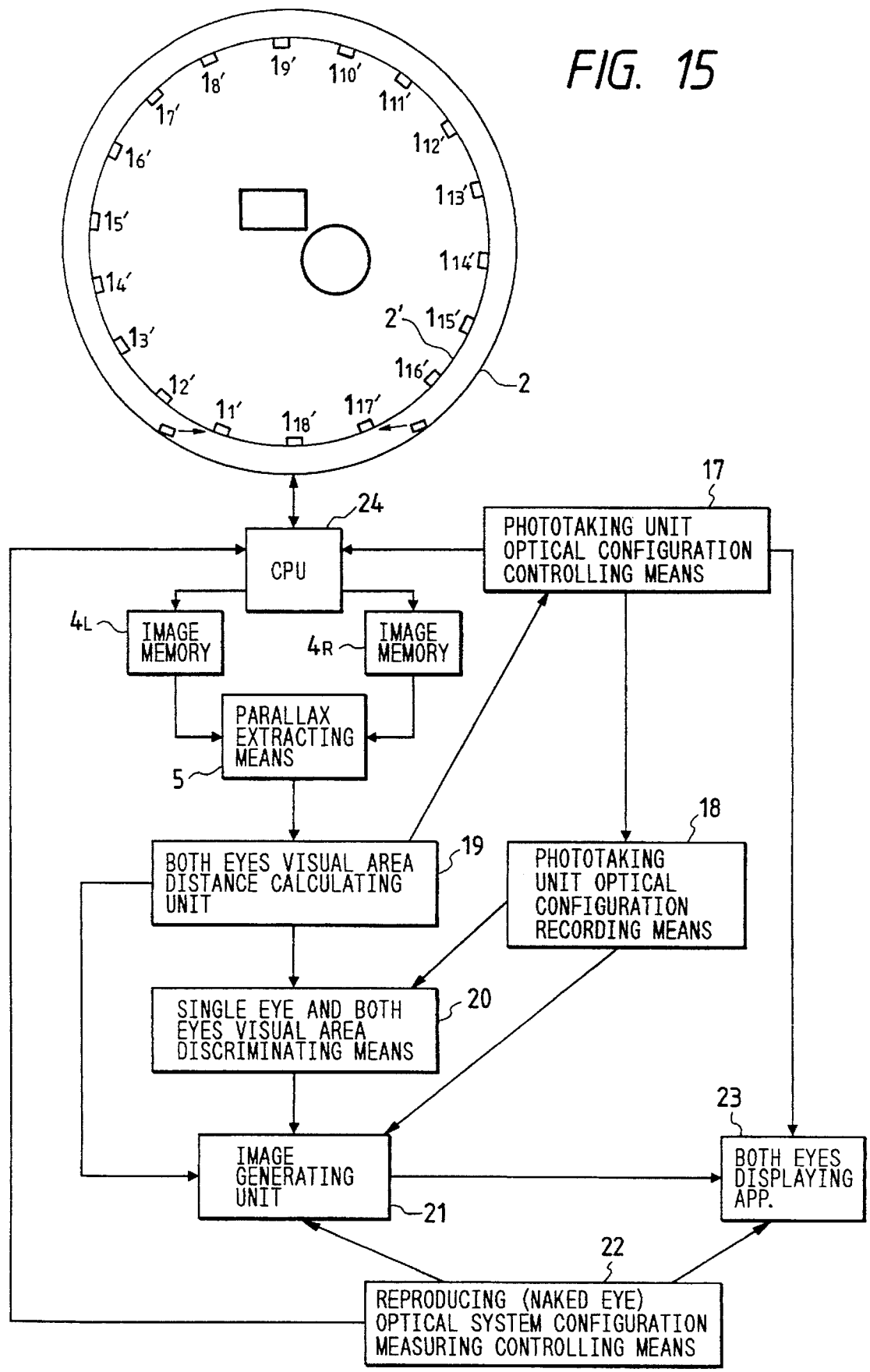
FIG. 15 is a block diagram showing the arrangement of a system of the fifth embodiment.

FIG. 15 shows the camera configuration and the system arrangement according to the fifth embodiment of the present invention.

Cameras $1_1'$, $1_2'$, ..., $1_{18}'$ are arranged on a circular stage 2' at equal angular intervals. These cameras can be moved by a drive means (not shown) on a stage 2 having a larger diameter than that of the circular stage 2'. With this arrangement, a stereoscopic image of the whole round of an object or a normal (non-stereoscopic) image from an arbitrary visual point position can be continuously generated from a finite number of image data to follow a change in position, posture, and the like of an observer.

As has been described in the third embodiment, since a phototaking unit, an image processing unit, and an image displaying unit can independently exchange data (using communication units (not shown); based on radio communications, optical fiber cables, and the like), even when the phototaking unit is separated away from the observer, an object image can be generated in correspondence with motion of the observer.

In the system shown in FIG. 15, if the cameras are not moved, a plurality of sets of image displaying units and image processing units are prepared in correspondence with a single phototaking unit, and a plurality of observers can enjoy proper images displayed according to their positions and postures while making independent motions.

Figure 16:
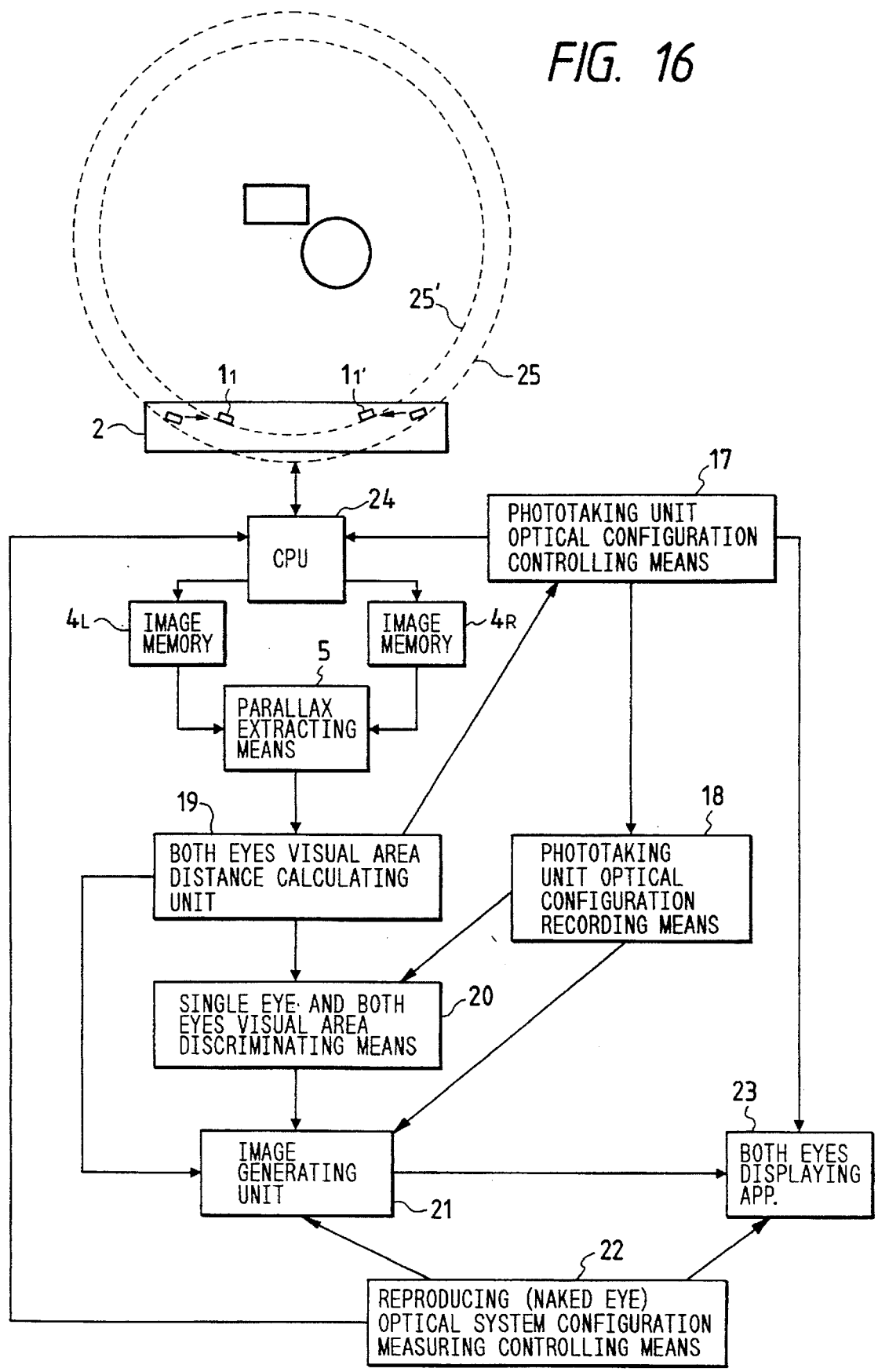
FIG. 16 is a block diagram showing the arrangement of a system of the sixth embodiment.

FIG. 16 shows the system arrangement according to the sixth embodiment of the present invention. In this embodiment, the stage 2 described in the third embodiment moves along a path 25 or 25'. If cameras $1_1$ and $1_1'$ can change their optical axis directions while moving on the stage 2, images from an arbitrary direction and view point of an object can be continuously generated in correspondence with motion of an observer as in the fifth embodiment.

In this embodiment, phototaking positions may be set in advance to generate images like in the third embodiment, or the stage and the cameras may be driven to follow the motion of an observer so as to display images. In the latter case, processing in the image processing unit is not particularly necessary.

In each of the above embodiments, a phototaking unit consisting of a plurality of cameras is used. Alternatively, images taken while changing the position and optical axis direction of a single camera, and the camera positions and optical axis angles may be recorded, and thereafter, the same processing as described above may be performed using the plurality of data by the image processing unit. Also, in order to calculate a distance, in place of extracting a parallax from images, another image processing or optical technique may be adopted.

As described above, since a system of the present invention is mainly constituted by a phototaking unit consisting of a plurality of movable cameras, and the like, an image processing unit having a function of processing images from two of the plurality of movable cameras, and acquiring distance information of a both eyes visible area, discriminating information of single eye visible areas, and the like, and an image displaying unit comprising, e.g., a display, images reflecting phototaking and reproducing optical configurations, and three-dimensional shape and disposal distance information of an object can be continuously displayed from a finite number of images which are taken in advance at a plurality of camera configurations, even at a view point position or optical configuration (the base line length and convergence angle of naked eyes, or the like) different from that upon phototaking. Thus, the system of the present invention can be applied to a VR system.

When image data of a real image obtained according to the present invention is synthesized with an image generated by computer graphics, interactive dynamic images according to the state and motion of an observer can be generated in a virtual image space. As described above, images which reflect all the view point positions and motions of an observer need not be taken and recorded in advance, and continuous dynamic images (two-dimensional or three-dimensional) according to the state of the observer can be generated from a finite number of still images.

What is claimed is:

1. An image recording/reproducing method for taking and recording a plurality of images using a plurality of cameras, and reproducing the recorded images, comprising the steps of:

extracting discriminating information between a double area comprising an area or parts of an image of a camera which is visible to at least two of the plurality of cameras and single eye areas comprising an area or parts of an image which is visible to only one of the plurality of cameras in each image taken by the plurality of cameras, intensity information of pixels, and parallax information on the double area;

recording the discriminating, intensity, and parallax information on a recording medium in a predetermined format;

storing optical configuration information of the plurality of cameras; and calculating proper parallax values upon reproducing on the basis of the recorded information and the optical configuration information.

2. A method according to claim 1, wherein said recording medium records the image data of the double eye area using either right or left image data and records parallax values to be used for generating either right or left image data which is not recorded.

3. An image recording/reproducing method comprising the steps of:

controlling positions and optical axis angles of a plurality of phototaking means;

storing optical configuration information of the plurality of phototaking means;

measuring the positions and optical axis angles of the plurality of phototaking means;

extracting parallax values between the plurality of images or distances at each point of the images from the viewpoint of phototaking using different optical configurations of the plurality of phototaking means;

recording image data and distance or parallax data representing the plurality of images and the parallax; and generating images on the basis of the recorded data and the stored information on optical configuration.

4. An image recording/reproducing apparatus comprising:

extracting means for extracting at least one of discriminating information of a double area comprising an area or parts of an image of a camera which is visible to at least two of the plurality of cameras and non-double areas comprising an area or parts of an image which is visible to only one of the plurality of cameras of a plurality of images and parallax information on the double area on the basis of image information;

recording means for recording the extracted information on a recording medium in a predetermined format together with the image information; and calculating means for calculating a proper parallax upon reproducing on the basis of optical configuration information upon phototaking of the plurality of images, and the information recorded on the recording medium.

5. An image recording/reproducing method for taking and recording a plurality of images using a plurality of cameras, and reproducing the recorded images, comprising the steps of:

extracting discriminating information between a double area comprising an area or parts of an image of a camera which is visible to at least two of the plurality of cameras and single eye areas comprising an area or parts of an image which is visible to only one of the plurality of cameras in each image taken by the plurality of cameras, intensity information of pixels, and parallax information on the double area;

recording the discriminating, intensity, and parallax information on a recording medium in a predetermined format;

storing optical configuration information of the plurality of cameras; and generating images at a viewpoint different from that of phototaking on the basis of a proper parallax value calculated at a viewpoint position or an optical arrangement which is different from that at the time of phototaking on the basis of the recorded information and the optical configuration information.

* * * * *